United States Patent [19]

Strope

[11] Patent Number: 5,512,004
[45] Date of Patent: Apr. 30, 1996

[54] LENS EDGING MACHINE BEVEL CONTROL PROCESS

[75] Inventor: Todd R. Strope, Tulsa, Okla.

[73] Assignee: Coburn Optical Industries, Inc., Tulsa, Okla.

[21] Appl. No.: 73,538

[22] Filed: Jun. 8, 1993

[51] Int. Cl.$^6$ ................................................. B24B 9/14
[52] U.S. Cl. ................................ 451/5; 451/8; 451/43
[58] Field of Search ............................. 51/165.71, 165.74, 51/284 E, 106 LG, 105 LG; 451/5, 8, 43, 255, 256

[56] References Cited

U.S. PATENT DOCUMENTS

| | | | |
|---|---|---|---|
| 4,596,091 | 6/1986 | Daboudet | 51/165.75 |
| 4,912,880 | 4/1990 | Haddock | 51/284 E |
| 5,053,971 | 10/1991 | Wood et al. | 51/284 E |
| 5,148,637 | 9/1992 | Byron | 51/284 E |

FOREIGN PATENT DOCUMENTS

| | | |
|---|---|---|
| 196114 | 10/1986 | European Pat. Off. . |
| 236182 | 9/1987 | European Pat. Off. . |
| 444902 | 9/1991 | European Pat. Off. . |
| 91 03794 | 3/1991 | WIPO . |

OTHER PUBLICATIONS

Patent Abstracts of Japan vol. 9, No. 282 (M–428) 9 Nov. 1985 & JP–A–60 123 259 (Nihon Kougaku Koguo K.K.) 1 Jul. 1985.

*Primary Examiner*—Robert A. Rose
*Attorney, Agent, or Firm*—Frank J. Catalano; Scott R. Zingerman

[57] ABSTRACT

An improved process for positioning a bevel along the edge of an opthamalic lens computes point-to-wheel data definitive of a planar relationship between the lens and the wheel, stores the point-to-wheel data, computes corrected horizontal displacement data definitive of a three dimensional relationship between the lens, the wheel and a plot of sequential contact points therebetween using the computed point-to-wheel data, stores the corrected horizontal displacement data, and controls the relative positions of the edging wheel and the lens in response to the corrected horizontal displacement data.

The corrected horizontal displacement data is computed by sequentially testing at successive incremental angles of a radius originating at a center of rotation of the lens at a beginning reference angle of the lens to determine an incremental angle at which the lens initiates contact with the wheel. This sequential testing is repeated at successive incremental angles at each sequentially successive incremental change in the reference angle to determine an incremental angle at which the lens initiates contact with the wheel for each incremental change.

8 Claims, 4 Drawing Sheets

LENS EDGING MACHINE BEVEL CONTROL PROCESS

BACKGROUND OF THE INVENTION

This invention relates generally to the edging of ophthalmic lenses and more particularly concerns a process for improving the bevel control operation of a lens edging machine. The control bevel operation of a lens edging machine controls the bevel placement around the lens shape. It is desirable to locate the bevel position equidistant in relation to the front curve of the lens so as to dispose the lens thickness on the wearer's side of the frame and thus preserve the frame's aesthetic quality.

Some presently known edging machines rely on mechanical forces in an attempt to maintain a consistent disposition of the edging wheel along the front curve of the lens. The edging wheel face is angled inwardly on either side of the bevel so that the wheel will be self-centered by the force of the lens within the angled face of the wheel. It is also imperative that the edging wheel floats freely in relation to the lens. However, the response of this relationship is not truly precise and, as the thickness of the lens increases, the wheel is no longer able to position itself properly.

Other edging machines attempt to overcome this problem by the use of patterns or servo-mechanisms which position the edging wheel either in response to the physical shape of the pattern or to the stored data which controls the operation of the servo system. However, present edging machines fail to place the bevel accurately because they do not use the correct information in deriving the horizontal displacement of the edging wheel. These systems use at best two dimensional data to control a three-dimensional function. Considering the axes of rotation of the edging wheel and the lens to be aligned in the X direction and a line normal to those axes and connecting them to be aligned in the Y direction, present systems typically use only Y axis data to determine the X axis displacement. However, because of the front curvature of the lens, the X displacement to the point of contact between the edging wheel and the lens is also a function of a vertical or Z axis distance taken from the actual point of contact between the lens and the edging wheel to the X-Y plane.

Considering the problem from another vantage point, present servo-type edging machines can only be accurate if the lens shape is circular, because the point of contact of the lens with the edging wheel must then be in the plane described by the axis of rotation of the lens shape and the center of rotation of the edging wheel. However, as the lens shape contorts to fit into fashion frames, the point of contact for various angular positions of the shape are not necessarily in that plane. As a result, the bevel thins out and the horizontal position "hooks" drastically at sharp lens corners.

Since the edging wheel has a finite non-zero radius, the edging machine must account for additional radial offset to prevent from cutting into the shape at a point of contact not in the plane connecting the centers of rotation of the lens and the wheel. The present process of computing the radial offsets Y or linear distances between the points of rotation of the lens and the wheel from the point data of the shape is called point-to-wheel data conversion. Point data, which is based on the radius of the shape, or wheel data, which is based on the displacement of the wheel from the shape, is inadequate to correct the problem.

It is therefore an object of this invention to provide an improved process for edging a lens which takes into consideration the curvature or X displacement of the lens edge in relation to a vertical or Z axis. Another object of this invention is to provide an improved process for edging a lens which employs servo-mechanism principles based on three-dimensional data. It is also an object of this invention to provide an improved process for edging a lens which enhances the consistency of displacement of the bevel of the lens in relation to the front face of the lens. And it is an object of this invention to provide an improved process for edging a lens which reduces the "hooking" manifested in lenses ground by edgers lacking three-dimensional capability.

SUMMARY OF THE INVENTION

In accordance with the invention, an improved process is provided in which a servo-type edging machine uses the point of contact information already calculated in its point-to-wheel data conversion routine to derive another table for use in horizontal positioning.

This point of contact is not necessarily along the line between the centers of rotation of the lens and the edging wheel, but may be farther up the wheel. The distance from the center of rotation of the lens to the point of contact provides suitable correction data for calculating horizontal displacement. A plot of the contact points for sequential angular positions θ of the lens at corresponding angular positions Δ of the line extending from the center of rotation of the lens to the point of contact for each sequential position θ defines the corrected horizontal data of the lens. This corrected horizontal data, in conjunction with a face curve function, computes proper horizontal displacement data for each position θ of the lens. This corrected horizontal displacement or sagital value process allows proper tracking of the bevel with the face curvature of the lens and resolves the corner "hooking" problem.

The improved process for positioning the bevel along the edge of the lens involves computing point-to-wheel data definitive of a planar relationship between the lens and the wheel, storing the point-to-wheel data, computing corrected horizontal displacement data definitive of a three dimensional relationship between the lens, the wheel and a plot of sequential contact points therebetween using the computed point-to-wheel data, storing the corrected horizontal displacement data, and controlling the relative positions of the edging wheel and the lens in response to the corrected horizontal displacement data.

The point-to-wheel data is computed by sequentially testing at successive incremental points of the point-to-wheel data at a beginning reference angle of the lens to determine a transition point at which the wheel ceases to increase and begins to decrease its displacement from the lens.

This sequential testing is repeated at successive incremental points for sequentially successive incremental changes in the reference angle to determine a transition point for each incremental change.

The corrected horizontal displacement data is computed by sequentially testing at successive incremental angles of a radius originating at a center of rotation of the lens at a beginning reference angle of the lens to determine an incremental angle at which the lens initiates contact with the wheel. This sequential testing is repeated at successive incremental angles at each sequentially successive incremental change in the reference angle to determine an incremental angle at which the lens initiates contact with the wheel for each incremental change.

Preferably, the beginning reference angles and the successive incremental changes in the reference angle of the point-to-wheel computing and the corrected horizontal displacement computing are identical and sequential testing at successive incremental points and at successive incremental angles occurs simultaneously for each sequentially successive incremental change in the reference angle.

BRIEF DESCRIPTION OF THE DRAWINGS

Other objects and advantages of the invention will become apparent upon reading the following detailed description and upon reference to the drawings in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
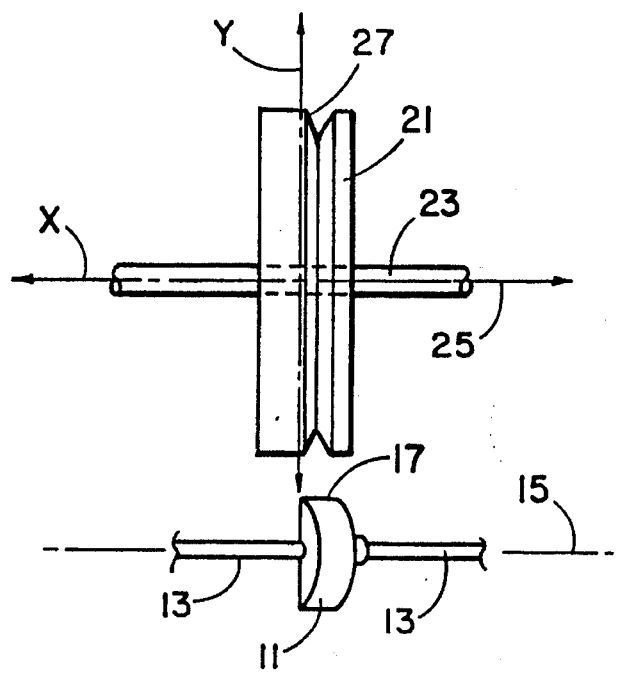
FIG. 1 is a top plan view illustrating the X-Y relationships of a lens and edging wheel in a servo-type edging machine.
Figure 2:
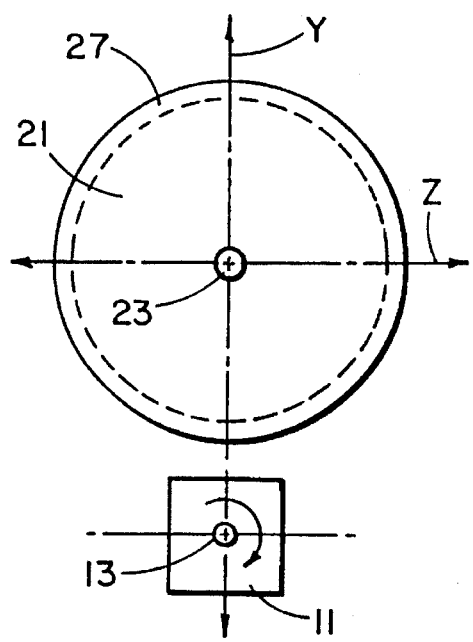
FIG. 2 is a side elevation view of the lens and edging wheel of FIG. 1.

Turning first to FIGS. 1 and 2, a lens 11 is mounted for rotation between opposing shafts 13 which rotate about a horizontal axis 15. A edging wheel 21 mounted on a shaft 23 parallel to the lens shaft 13 rotates about a parallel horizontal axis 25. The edging wheel 21 has an annular groove 27 about its circumferential surface which will provide the bevel along the edge 17 of the lens 11. This arrangement is typical of mechanical and servo-type lens edging machines. Depending on the particular design of the machine, the lens axis 15 may be fixed and the edging axis 25 movable in the Y direction to bring the axes 15 and 25 into and out of proximity or, in the alternative, the axis 25 of the edging wheel may be fixed and the lens axis 15 movable in the Y direction to vary the distance between the rotation axes 15 and 25. In addition, the edging wheel 27 may shift in the X direction to align the groove 27 and to position the bevel properly on the lens 11. Alternatively, the edging wheel 21 may remain fixed in the X direction while the lens 11 is shifted in the X direction.

Figure 3:
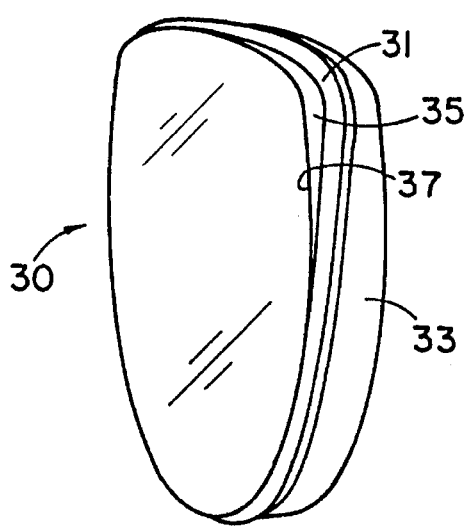
FIG. 3 is a perspective view illustrating a lens having a bevel ground by a mechanically controlled edging machine.
Figure 4:
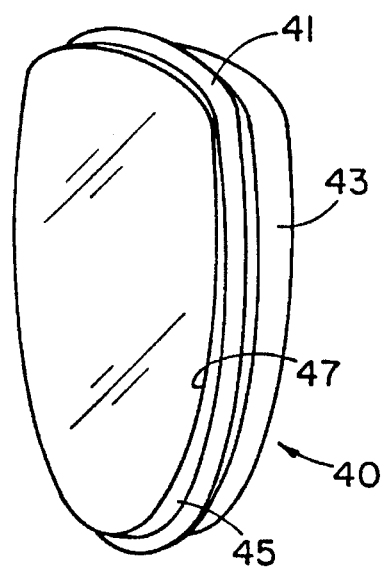
FIG. 4 is a perspective view of a lens having a bevel ground by a servo-type edging machine using non-three dimensional data.

Looking at FIGS. 3 and 4, lenses 30 and 40 are typical of the results achievable when non-corrected or inaccurately corrected data is used in establishing the X axis relationship of the edging wheel and the lens during the edging process. The lens 30 is representative of the work product when a mechanical lens edger is used to establish the X displacement between the edging wheel and the lens. The bevel 31 along the edge 33 shows a varying displacement 35 between the bevel 31 and the front face edge 37 of the lens 30. The rapid increase in the displacement 35 at the sharper corners of the lens 30 is known as "hooking". It is readily apparent that if the lens 30 were secured in a frame by seating the bevel 31 on the interior perimeter of the frame, the "hooking" portions of the lens 30 would protrude excessively beyond the front edge of the frame and thus diminish the aesthetic quality of the glasses. The lens 40 illustrated in FIG. 4 is typical of a lens edged in response to data obtained by point-to-wheel conversion in presently known servo-type edging machines. The point-to-wheel data results in the bevel 41 along the edge 43 of the lens 40 having a more consistent displacement 45 from the front face edge 47 of the lens 40. However, the "hooking" problem persists and the appearance of the glasses will fall short of the desired aesthetic quality.

Figure 5:
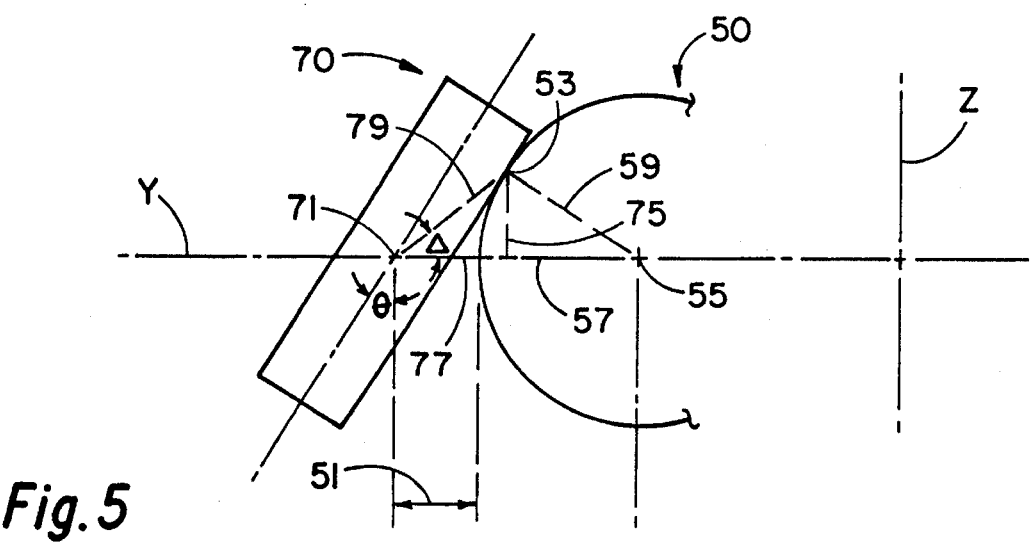
FIG. 5 is a geometric illustration of the Y-Z relationships between a edging wheel and a lens mounted for rotation in a servo-type edging machine.

FIG. 5 illustrates the relationship between a lens shape 70, an edging wheel 50, the wheel data position 51 and the point of contact 53. For some angular position θ of the lens shape 70, a triangle is described by the center of rotation 71 of the shape 70, the center of rotation 55 of the wheel 50 and the point of contact 53 of the lens 70 and the wheel 50. This triangle may be further divided into two right triangles by dropping a perpendicular 75 from the point of contact 53 to the line connecting the centers of rotation 71 and 55. These two right triangles are described by first and second sets of line segments 75, 77 and 79 and 75, 57 and 59, respectively. From the point of contact 53, the wheel data 51 for the lens position θ is equal to line segment 77+ line segment 57–line segment 59. The wheel data radius 59 is always greater than or equal to the point data radius 57 for the lens position θ. The proper data for horizontal positioning comes from line 79 which extends from the lens center of rotation 71 to the point of contact 53. At any given lens position θ, the angle Δ between the Y axis and the wheel data radius 79 will vary in accordance with the location of the point of contact 53. The line 79 wheel data radius is always greater than or equal to the point radius 77 for the lens position θ.

Figure 6:
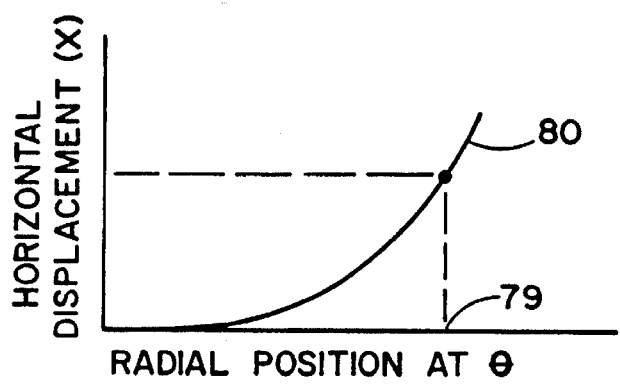
FIG. 6 is a graphic illustration of the relationship between the X, Y and Z characteristics of the lens edge and its point of contact with the edging wheel.

FIG. 6 illustrates the relationship between the radial offset 79 and the horizontal displacement X for some face curve 80 of n diopters. Knowing the proper radial offset 79 for each position θ and the face or front curve 80 of the lens 70, a more precise horizontal displacement X can be computed for the lens edging operation. The system must find the points of contact 53 for each sequential position θ, record the associated lengths of the lens point of contact radii 79, and compute the horizontal displacements X from these lengths and the face curve 80 of the lens 70.

Proper horizontal displacement of the edging wheel only comes from finding the radius of the shape at the point of contact, the corrected horizontal data radius. This radius is not necessarily the same as the radius of the shape in the plane described by the lens rotation axis and the center of the edging wheel. Nor is it necessarily the same as the radial displacement of the edging wheel from the lens in this plane. The horizontal displacement is then computed from this corrected horizontal data radius and a face curve function.

The calculation steps of the corrected horizontal displacement or sagital value method can best be understood by reference to FIGS. 1, 5, 6 and 7. An EPROM 90 which controls the operation of the improved servo-type edging machine has a point data input 91 and wheel data and corrected horizontal data outputs 93 and 95, respectively. Assuming a reference point 0 as an initial estimate of the wheel data position at some beginning lens position θ, the system sequentially tests successive points of the wheel data position 51 for the beginning lens angle θ. If the next succeeding wheel data position 51 causes the edging wheel to increase its displacement from the lens along the Y axis, the testing of wheel data positions will continue until the shape of the lens requires decreasing rather than increasing displacement of the edging wheel. This determines the point-to-wheel data for the lens shape being edged at the beginning lens position θ. The process continues to determine the entire point-to-wheel data of the lens by sequencing through the possible lens positions $θ_n$. At the same time as the wheel data is being determined, a sequence of angles Δ is tested with respect to each of the angles θ with the lens. That is, for each incremental change in the lens position θ, an entire sequence of incremental changes in the point of contact angle Δ is also sampled. Data is recorded for each sequential lens angle θ and its associated point of contact angle Δ which together identify a point of contact. By finding this point of contact, the system compensates for the offset of the contact point of the lens and the wheel from a reference point on the X axis. That is, data is recorded for each point at which the Δ and θ angles define a contact point of the wheel and lens. This process is completed for each incremental increase in θ until all of the contact points are found, thus providing the completed corrected horizontal displacement X which locates the lens bevel in more constant spacing in relation to the front face edge of the lens.

Figure 8:
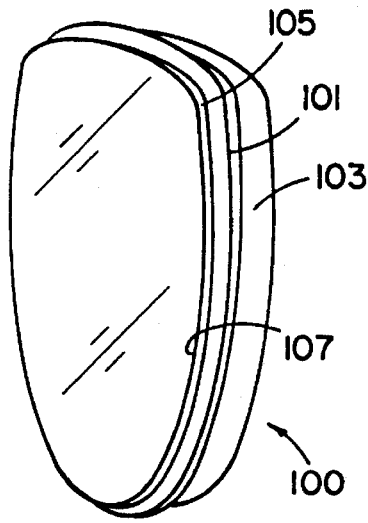
FIG. 8 is a perspective view of a lens ground in accordance with the process of FIG. 7.
Figure 7:
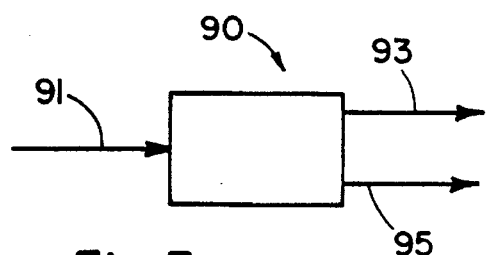
FIG. 7 is a block diagram illustrating the improved edging process of the present invention.

In a broader view of the improved edging process, the operator will first determine the lens curvature which meets the prescription requirements of the patient. The desired lens is then matched to this prescription. The lens shape or point data for the selected lens is then displayed on a screen. The point-to-wheel data is computed and, in accordance with the above description, the corrected horizontal displacement data is also computed. The lens is then ground in response to this data, first to the approximate shape necessary to suit the frame and finally, in response to the corrected horizontal data, to obtain the finished lens. A lens 100 edged in accordance with the improved method is illustrated in FIG. 8. The bevel 101 along the edge 103 of the improved method lens 100 is seen to display substantially better consistency of displacement 105 from the front face edge 107 of the lens 100 than is displayed by the lenses 30 and 40 of FIGS. 3 and 4.

Figure 9:
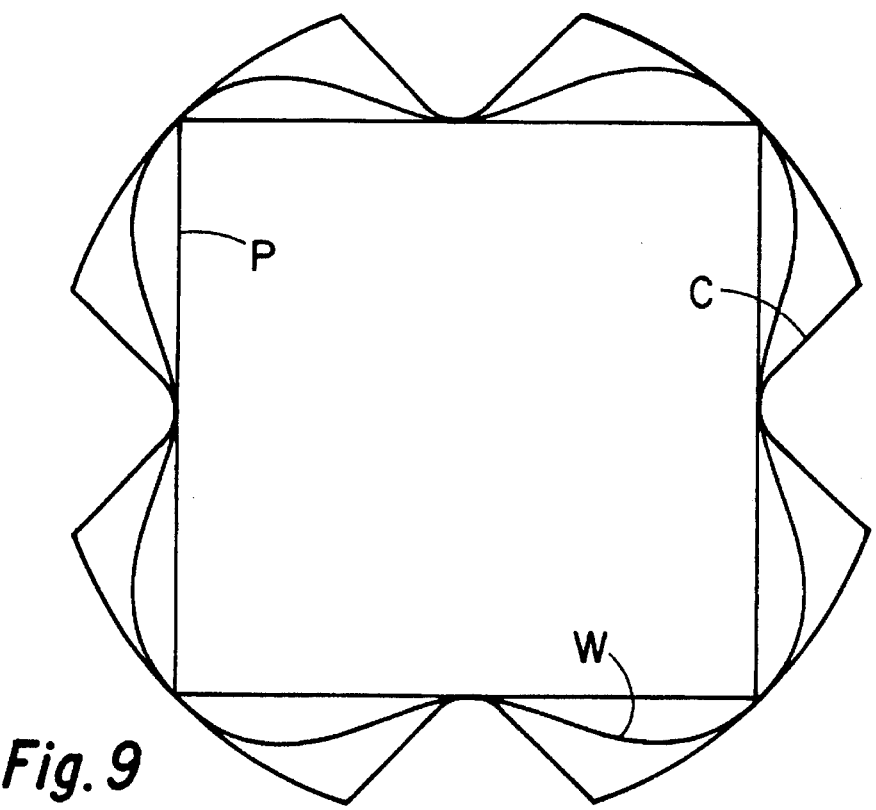
FIG. 9 is a graphic comparison of square lens point data and point-to-wheel conversion data with the corrected horizontal displacement data used in the improved process of the present invention.
Figure 10:
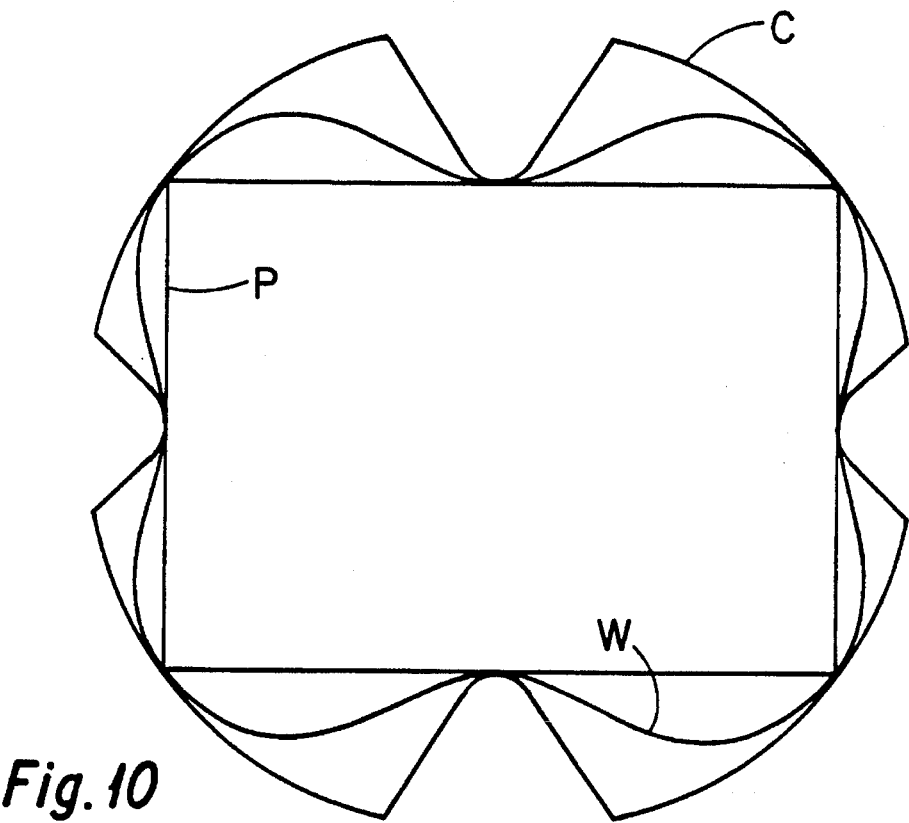
FIG. 10 is a graphic comparison of rectangular lens point data and point-to-wheel conversion data with the corrected horizontal displacement data used in the improved present and point-to-wheel conversion data with the corrected horizontal displacement data used in the improved process of the present invention.
Figure 11:
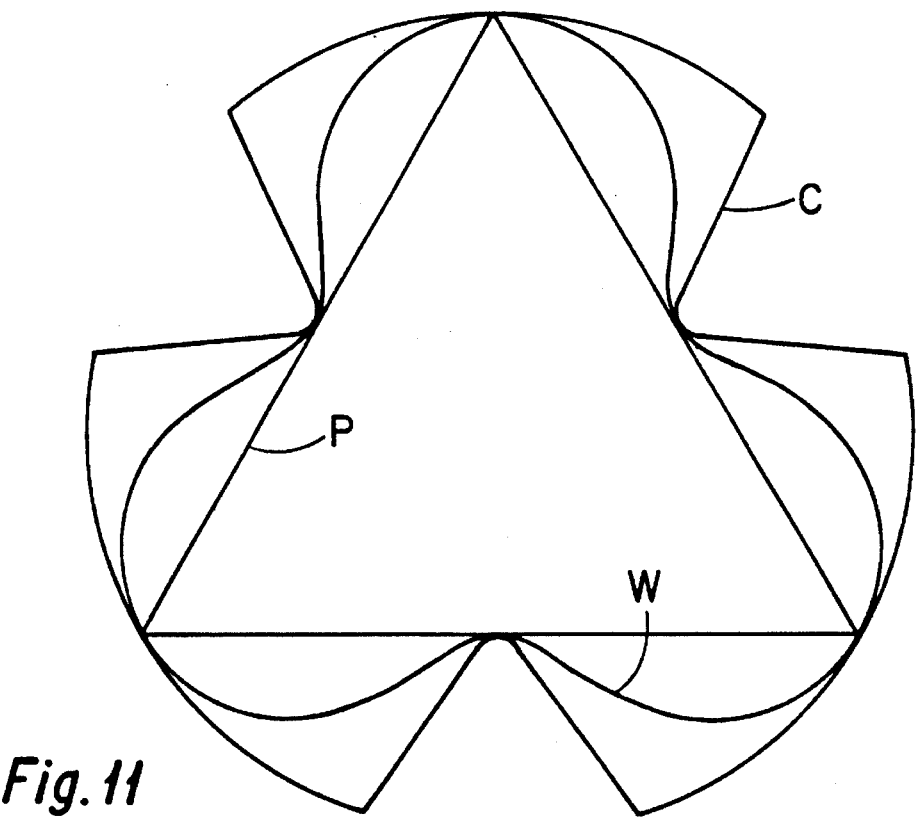
FIG. 11 is a graphic comparison of triangular lens point data and point-to-wheel conversion data with the corrected horizontal displacement data used in the improved process of the present invention.
Figure 12:
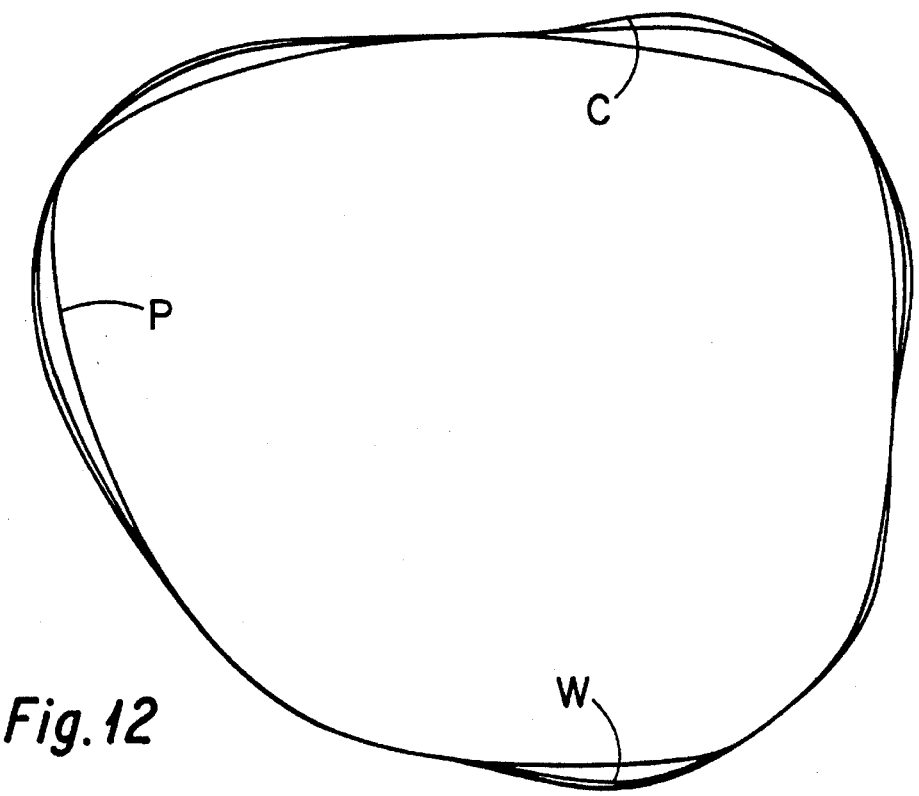
FIG. 12 is a graphic comparison of the point data, point-to-wheel conversion data and corrected horizontal displacement data in accordance with the improved process of the present invention for a traditional lens.

The reason for the improvement is illustrated in FIGS. 9 through 12 comparing the point contact data P and the point-to-wheel conversion data W with the corrected horizontal displacement data C for square, rectangular, triangular and more traditional lens shapes, respectively. Observation of the data curves of the more unconventional shapes shown in FIGS. 9, 10 and 11 shows that the positioning of the edging wheel in a corrected horizontal displacement curve is not intuitive. Consequently, it will be recognized that the more subtle variations between the point-to-wheel conversion data W and the corrected horizontal displacement data C illustrated in FIG. 12 will result in remarkable improvement in the bevel placement of the lens, as is illustrated in FIG. 8.

While the invention has been described in relation to a lens of spherical front face, it is not limited to spherical front faced lenses.

Thus, it is apparent that there has been provided, in accordance with the invention, a lens edging machine bevel control process that fully satisfies the objects, aims and advantages set forth above. While the process has been described in conjunction with specific steps and embodiments, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A process for positioning a bevel along the edge of an ophthalmic lens defined by a selected face curve function by use of an edging wheel in a servo-controlled edging machine comprising the steps of:

iteratively calculating straight-line intershaft distances between said lens and said wheel for sequential radius vectors defining a final shape of said lens until a contact point between said lens and said wheel for each said vector is determined; and storing vector lengths and angles of said contact points as corrected horizontal data.

2. A process according to claim 1 further comprising the steps of:

computing corrected horizontal displacement data as sequential sagital values for said vector length of each of said contact point vectors using said face curve function; and controlling the relative positions of said edging wheel and said lens in response to said corrected horizontal displacement data.

3. A process according to claim 1, said step of iteratively calculating comprising the sub-steps of:

sequentially testing at successive incremental angles of a radius originating at a center of rotation of said lens at a beginning reference angle of said lens to determine an incremental angle at which said lens initiates contact with said wheel; and repeating said step of sequentially testing at successive incremental angles at each sequentially successive incremental change in said reference angle to determine an incremental angle at which said lens initiates contact with said wheel for each said incremental change.

4. A process for positioning a bevel along the edge of an ophthalmic lens defined by a selected face curve function by use of an edging wheel in a servo-controlled edging machine comprising the steps of:

computing point-to-wheel data definitive of a planar relationship between said lens and said wheel;

storing said point-to-wheel data;

iteratively calculating straight-line intershaft distances between said lens and said wheel for sequential radius vectors defining a final shape of said lens until a contact point between said lens and said wheel for each said vector is determined;

storing vector lengths and angles of said contact points as corrected horizontal data;

computing corrected horizontal displacement data as sequential sagital values for said vector length of each of said contact point vectors using said face curve function; and controlling the relative positions of said edging wheel and said lens in response to said point-to-wheel data and said corrected horizontal displacement data.

5. A process according to claim 4, said step of iteratively calculating comprising the sub-steps of:

sequentially testing at successive incremental angles of a radius originating at a center of rotation of said lens at a beginning reference angle of said lens to determine an incremental angle at which said lens initiates contact with said wheel; and repeating said step of sequentially testing at successive incremental angles at each sequentially successive incremental change in said reference angle to determine an incremental angle at which said lens initiates contact with said wheel for each said incremental change.

6. A process according to claim 5, said beginning reference angles of said point-to-wheel computing and said corrected horizontal data computing sub-steps being identical.

7. A process according to claim 6, said successive incremental changes in said reference angle for said point-to-wheel computing and said corrected horizontal data computing sub-steps being identical.

8. A process according to claim 7, said sub-steps of sequentially testing at successive incremental points and of testing at successive incremental angles occurring simultaneously for each sequentially successive incremental change in said reference angle.

* * * * *